(12) United States Patent
Schnitzer et al.

(10) Patent No.: US 12,174,298 B2
(45) Date of Patent: Dec. 24, 2024

(54) LIDAR SENSOR FOR OPTICALLY DETECTING A FIELD OF VISION, WORKING DEVICE OR VEHICLE INCLUDING A LIDAR SENSOR, AND METHOD FOR OPTICALLY DETECTING A FIELD OF VISION

(71) Applicant: Robert Bosch GmbH, Stuttgart (DE)

(72) Inventors: Reiner Schnitzer, Reutlingen (DE); Tobias Hipp, Hechingen (DE); Annemarie Holleczek, Ludwigsburg (DE); Thomas Maurer, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 978 days.

(21) Appl. No.: 17/269,323

(22) PCT Filed: Jul. 17, 2019

(86) PCT No.: PCT/EP2019/069182
§ 371 (c)(1),
(2) Date: Apr. 5, 2021

(87) PCT Pub. No.: WO2020/038666
PCT Pub. Date: Feb. 27, 2020

(65) Prior Publication Data
US 2021/0311193 A1     Oct. 7, 2021

(30) Foreign Application Priority Data

Aug. 22, 2018   (DE) .......................... 102018214140.1

(51) Int. Cl.
*G01S 17/89*     (2020.01)
*G01S 7/481*     (2006.01)
*G01S 7/4863*    (2020.01)

(52) U.S. Cl.
CPC .............. *G01S 17/89* (2013.01); *G01S 7/4811* (2013.01); *G01S 7/4815* (2013.01); *G01S 7/4863* (2013.01)

(58) Field of Classification Search
CPC ...... G01S 17/89; G01S 7/4815; G01S 7/4863; G01S 7/4811; G01S 7/4816
(Continued)

(56) References Cited

U.S. PATENT DOCUMENTS 9,395,192 B1 *   7/2016   Silver .................... G01S 13/865
9,638,520 B2 *   5/2017   Eisele ..................... G01C 3/08
(Continued)

FOREIGN PATENT DOCUMENTS

CA      2959335 A1    3/2016
CN      1502047 A     6/2004
(Continued)

OTHER PUBLICATIONS

International Search Report for PCT/EP2019/069182, Issued Sep. 27, 2019.

*Primary Examiner* — Daniel L Murphy
(74) *Attorney, Agent, or Firm* — NORTON ROSE FULBRIGHT US LLP; Gerard A. Messina

(57) ABSTRACT

A LIDAR sensor for optically detecting a field of vision. The LIDAR sensor includes a transmitting unit including a laser pattern generation unit, the laser pattern generation unit being designed to generate an illumination pattern in the field of vision; a receiving unit including at least one detector unit for receiving secondary light which was reflected and/or scattered by an object in the field of vision; the at least one detector unit including a plurality of pixels, and at least some pixels in each case including a multitude of activatable single-photon avalanche diodes; at least one rotor unit rotatable about a rotation axis, the transmitting
(Continued)

unit and the receiving unit being at least partially situated on rotor unit. The LIDAR sensor furthermore includes at least one linker, which is designed to link detection signals of at least two single-photon avalanche diodes of a pixel via a combinational logic.

8 Claims, 5 Drawing Sheets

(58) Field of Classification Search
USPC .......................................................... 356/4.01
See application file for complete search history.

(56) References Cited

U.S. PATENT DOCUMENTS

| | | | |
|---|---|---|---|
| 2014/0078491 A1 | 3/2014 | Eisele et al. | |
| 2016/0161600 A1 | 6/2016 | Eldada et al. | |
| 2017/0176579 A1 | 6/2017 | Niclass et al. | |
| 2018/0003821 A1 | 1/2018 | Mai | |
| 2018/0009517 A1 | 1/2018 | Woody | |
| 2018/0095175 A1 | 4/2018 | O'Keeffe | |
| 2018/0123611 A1 | 5/2018 | Dutton et al. | |

FOREIGN PATENT DOCUMENTS

| | | |
|---|---|---|
| CN | 104142506 A | 11/2014 |
| CN | 104570002 A | 4/2015 |
| CN | 107966704 A | 4/2018 |
| DE | 102011005746 A1 | 9/2012 |
| DE | 102016219955 A1 | 4/2018 |
| DE | 102017202353 A1 | 8/2018 |
| EP | 3312629 A2 | 4/2018 |
| JP | H0224934 A | 1/1990 |
| JP | 2007170917 A | 7/2007 |
| JP | 2015081921 A | 4/2015 |
| JP | 2016109679 A | 6/2016 |
| JP | 2016156789 A | 9/2016 |
| WO | 2018128655 A2 | 7/2018 |

* cited by examiner

LIDAR SENSOR FOR OPTICALLY DETECTING A FIELD OF VISION, WORKING DEVICE OR VEHICLE INCLUDING A LIDAR SENSOR, AND METHOD FOR OPTICALLY DETECTING A FIELD OF VISION

FIELD

The present invention relates to a LIDAR sensor for optically detecting a field of vision, to a working device or a vehicle including a LIDAR sensor, and to a method for optically detecting a field of vision.

BACKGROUND INFORMATION

German Patent Application No. DE 10 2016 219 955 A1 describes a transmitting unit for illuminating surroundings, in particular of a vehicle, including a laser pattern generation unit, a deflection unit, and a control unit. The laser pattern generation unit is configured to generate an illumination pattern in a field of vision, the illumination pattern having a first direction and a second direction, the first direction and the second direction being situated orthogonally to one another, an extension of the illumination pattern along the first direction being greater than an extension of the illumination pattern along the second direction, the illumination pattern, in particular, being a checked pattern, and the control unit being configured to move the deflection unit at least along the second direction so that the illumination pattern is moved at least along the second direction.

U.S. Patent Application Publication No. 2017/0176579 A1 describes an electrooptical device which includes a laser light source, which emits at least one beam of light pulses, a beam guiding device, which sends the at least one beam over a target scene and scans it, and an array of sensor elements. Each sensor element outputs a signal, which indicates an incidence time of an individual photon on the sensor element. A light collection optics maps the target scene scanned by the transmitted beam onto the array. The circuit is coupled to actuate the detection elements only in a selected area of the array, and to guide the selected area over the array synchronously with the scanning of the at least one beam. A scanning system is thus described, which successively activates detector pixels to increase the signal-to-noise ratio of the sensor. It is a micromirror-based implementation of a LIDAR system. The detector pixels are switched to be active in a so-called region of interest (ROI).

U.S. Patent Application Publication No. US 2018/0003821 A1 describes an object detector, which includes a light emitting system and a light receiving system. The light emitting system includes a light source including a plurality of light emitting elements, which are situated in a single axis direction. The light emitting system emits light. The light emitting elements are individually and consecutively activatable laser diodes. The light receiving system receives the light emitted by the light emitting system and reflected by an object. The plurality of light emitting elements emits a plurality of light beams to a plurality of areas which differ in the single axis direction. The amount of light for illuminating some of the plurality of areas differs from the amount of light for illuminating an area other than that of some of the plurality of areas. It is described that exactly one receiving element is assigned to each light emitting element.

SUMMARY

The present invention is directed to a LIDAR sensor for optically detecting a field of vision. In accordance with an example embodiment of the present invention, the LIDAR sensor includes a transmitting unit including a laser pattern generation unit for emitting primary light into the field of vision. The laser pattern generation unit, in particular, includes at least one laser. The laser pattern generation unit is designed to generate an illumination pattern in the field of vision, the illumination pattern having a first direction and a second direction, the first direction and the second direction being situated orthogonally to one another. The first direction and the second direction are situated essentially orthogonally to one another in the process. This means that minor deviations from the right angle are also encompassed. For example, deviations which occur as a result of an adjustment error of a laser are also encompassed. An extension of the illumination pattern along the first direction is greater than an extension of the illumination pattern along the second direction. The illumination pattern is, in particular, designed as a line, a rectangle, or a checked pattern. The LIDAR sensor furthermore includes a receiving unit including at least one detector unit for receiving secondary light which was reflected and/or scattered by an object in the field of vision. The at least one detector unit includes a plurality of pixels, at least some pixels including a multitude of activatable single-photon avalanche diodes. The LIDAR sensor furthermore includes a rotor unit rotatable about a rotation axis. The transmitting unit of the LIDAR sensor is at least partially situated on the rotor unit. The receiving unit of the LIDAR sensor is at least partially situated on the rotor unit.

According to an example embodiment of the present invention, the LIDAR sensor includes at least one linker, which is designed to link detection signals of at least two single-photon avalanche diodes of a pixel with the aid of a combinational logic.

In accordance with an example embodiment of the present invention, the LIDAR sensor furthermore includes, in particular, at least one evaluation unit. The at least one evaluation unit is designed to determine a light propagation time of the emitted primary light and of the secondary light received again. The distance between the LIDAR sensor and an object in the field of vision may be determined based on a signal time of flight (TOF) or based on a frequency-modulated continuous wave (FMCW) signal. The light propagation time methods include pulse methods, which determine the reception point in time of a reflected laser pulse, or phase methods, which emit an amplitude-modulated light signal and determine the phase offset with respect to the received light signal.

The detector unit includes a multitude of activatable single-photon avalanche diodes (SPAD). A single-photon avalanche diode may be referred to as a subpixel in the process. So-called macropixels are created by linking at least two single-photon avalanche diodes of a pixel. The pixels of the detector unit may be referred to as macropixels. A single-photon avalanche diode triggers an electrical pulse when a minimum light quantity is incident on a light-intensive area of the single-photon avalanche diodes. The light quantity may already be achieved with a single photon. A single-photon avalanche diode may accordingly be very sensitive. After the electrical pulse has been provided, the single-photon avalanche diode requires a fixed time until it is ready again to provide a further electrical pulse in response to the incidence of the minimum light quantity. During this time, no light may be registered. This time may be referred to as dead time.

An advantage of the present invention is that the dynamic range of the detector unit may be increased. The pixels, i.e., macropixels, allow the use of the single-photon avalanche diodes which otherwise are usually too sensitive. The performance of a pixel may be optimized regardless of the optically required size. In the case of a defective single-photon avalanche diode of a pixel, it is not the entire pixel that fails. The light efficiency of a pixel is thus increased in the event of a defective single-photon avalanche diode. In the case of a flexible assignment of the pixels to evaluation units of the LIDAR sensor, an adaptation of the area of the detector unit to be evaluated in the subpixel range may be made possible. This allows the detector unit to be easily adapted to the transmitting unit of the LIDAR sensor. The adjustment of the transmitting unit and of the receiving unit is facilitated.

In one advantageous embodiment of the present invention, it is provided that the linker is an OR linker or an exclusive OR linker. In the case of an OR linker, the reception point in time of a photon is encoded in the rising edge of the output signal of a subpixel. The logically active phase of the output signal reflects the dead time of the subpixel. In the case of an exclusive OR linker, the subpixel is switched to a toggle flip flop. Each photon detection of a subpixel thus results in a state change of the output signal. In other words, the reception point in time of a photon is now encoded in the rising and falling edges of the output signal. An advantage of this embodiment is that an evaluation unit does not have to be assigned to each subpixel.

In a further advantageous embodiment of the present invention, the linker being an OR linker, the LIDAR sensor furthermore includes at least one pulse shortener to temporally shorten a digital signal generated by a single-photon avalanche diode. The dead time between individual signals may be shortened. An advantage of this embodiment is that the signal throughput may be increased. An increased photon count rate may be achieved.

In a further advantageous embodiment of the present invention, it is provided that the pixels are situated in a grid having a predefined number of rows and a predefined number of columns. The pixels of at least one row and/or the pixels of at least one column are activatable in parallel. During the reception of secondary light, each pixel in a column may be active. In the process, each single-photon avalanche diode of these pixels in the corresponding column may also be active. During the reception of secondary light, each pixel in a row may be active. In the process, each single-photon avalanche diode of these pixels in the corresponding row may also be active. The advantage of this embodiment is that an enhanced detection of the secondary light caused by the emitted illumination pattern may be achieved. For example, when using multiple lasers in the laser pattern generation unit, it is not necessary to assign a certain laser of the laser pattern generation unit to exactly one single-photon avalanche diode of the detector unit.

In a further advantageous embodiment of the present invention, the LIDAR sensor furthermore includes at least one control unit, which is designed to move the rotatable rotor unit at least along the second direction, so that the illumination pattern is moved at least along the second direction. The laser pattern generation unit thus generates an illumination pattern which is scanned orthogonally to the first direction. The illumination pattern is thus not scanned pixel by pixel, but as a whole. As a result, this is a combination of the flash principle and the scan principle, which are available from conventional LIDAR sensors. An advantage of this embodiment is that the required pulse power of the laser pattern generation unit may be kept low. The required pulse power of the at least one laser of the laser pattern generation unit may be kept low. The pulse power may be kept lower than compared to a LIDAR sensor operating according to the flash principle. The combination of the flash principle and the scan principle additionally makes it possible to increase the pulse number of the at least one laser of the laser pattern generation unit per measurement. This is, in particular advantageous during the use of a detector unit which includes single-photon avalanche diodes. In addition, the eye safety of the LIDAR sensor may be increased. At the same time, the measuring time may be increased compared to a LIDAR sensor operating according to the scan principle. As a result of the generation of the illumination pattern in the field of vision, the resolution in one direction is no longer limited by a number of laser units and detector diodes. The resolution along the first direction is dependent on the receiving unit of the LIDAR sensor. The resolution along the first direction may be dependent on a reception optics of the receiving unit. The resolution along the first direction is dependent on the number of pixels of the detector unit. The resolution along the second direction is dependent on the scanning unit of the LIDAR sensor. The rotor unit rotatable about a rotation axis may be referred to as a scanning unit in the process.

In a further advantageous embodiment of the present invention, it is provided that the transmitting unit and the receiving unit are situated on top of one another or next to one another along the rotation axis of the rotatable rotor unit. The advantage of this embodiment is that the requirements may be taken into consideration, for example, during the installation of the LIDAR sensor in a vehicle. In this way, for example, the requirements with respect to the overall height of the LIDAR sensor may be taken into consideration.

The present invention is furthermore directed to a working device or a vehicle including an above-described LIDAR sensor.

The present invention is furthermore directed to a method for optically detecting a field of vision with the aid of a described LIDAR sensor. In accordance with an example embodiment of the present invention, the method includes the generation of an illumination pattern in a field of vision, the illumination pattern having a first direction and a second direction. The first direction and the second direction are situated essentially orthogonally to one another. An extension of the illumination pattern along the first direction is greater than an extension of the illumination pattern along the second direction. The method furthermore includes the activation of a rotor unit for the rotation about a rotation axis with the aid of a control unit, so that the illumination pattern is moved at least along the second direction. The method furthermore includes the reception of secondary light which was reflected and/or scattered in the field of vision by an object, with the aid of at least one detector unit. The at least one detector unit includes a plurality of pixels. At least some pixels in each case include a multitude of activatable single-photon avalanche diodes. The method furthermore includes the linking of the detection signals of at least two single-photon avalanche diodes of a pixel via a combinational logic with the aid of a linker.

BRIEF DESCRIPTION OF THE DRAWINGS

Exemplary embodiments of the present invention are described in greater detail hereafter based on the figures. Identical reference numerals in the figures indicate identical or identically operating elements.

DETAILED DESCRIPTION OF EXAMPLE EMBODIMENTS

Figure 1:
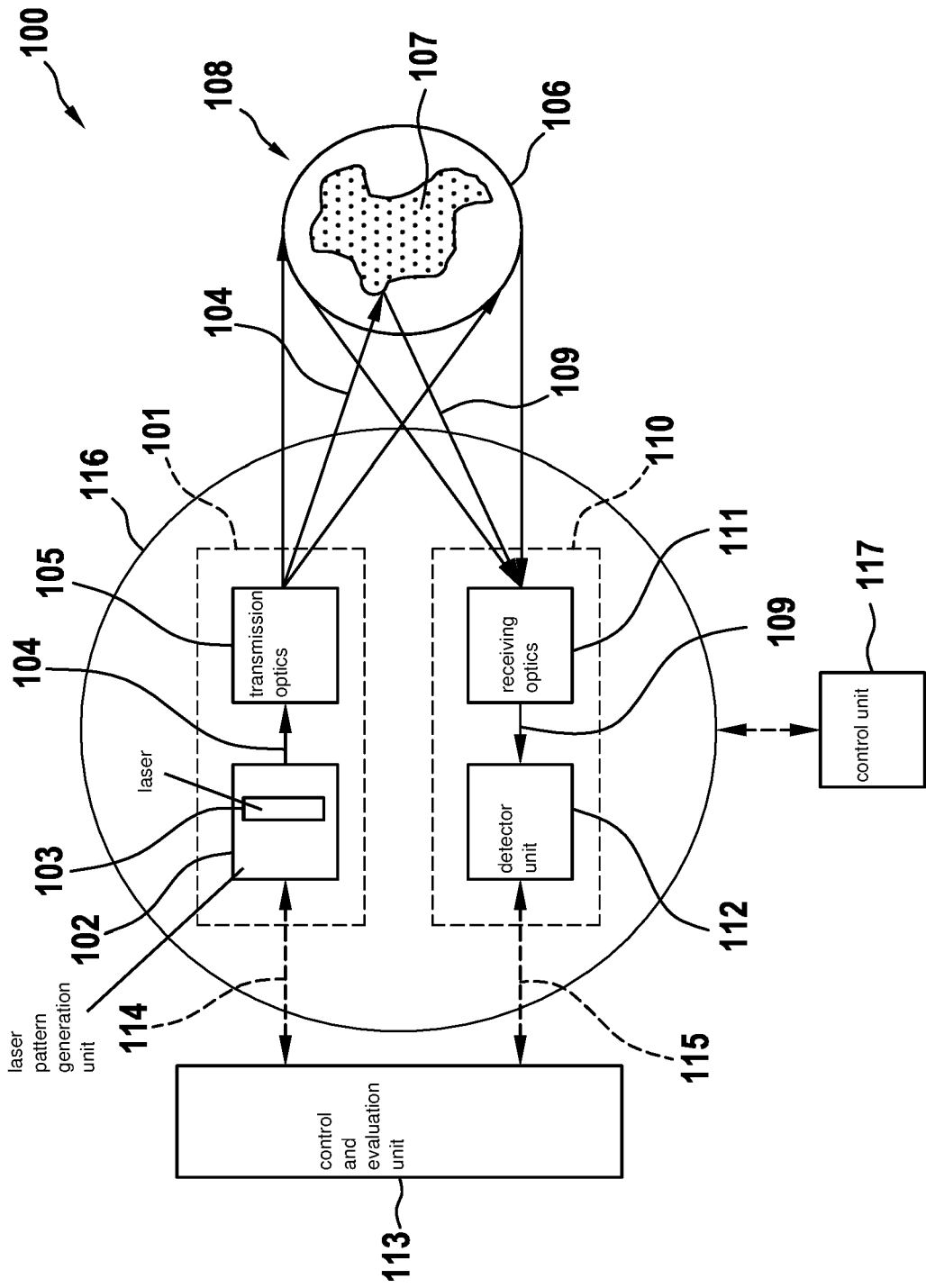
FIG. 1 shows a top view onto a first exemplary embodiment of a LIDAR sensor, in accordance with the present invention.

FIG. 1 shows, by way of example, the top view onto a LIDAR sensor 100. LIDAR sensor 100 according to FIG. 1 includes a transmitting unit 101 including a laser pattern generation unit 102 for emitting primary light 104 into field of vision 106. In the example, laser pattern generation unit 102 includes laser 103. Laser 103 may have a line orientation, for example. The emitted primary light 104 may pass through a transmission optics 105 during the emission into field of vision 106. Transmission optics 105 may, for example, include at least one lens or at least one optical filter. Primary light 104 is emitted for the detection and/or examination of a scene 108 and an object 107 present there. Field of vision 106 is the area of the surroundings which transmitting unit 101 is able to illuminate. Field of vision 106 preferably extends at a distance of 1 m to 180 m from transmitting unit 101.

LIDAR sensor 100 according to FIG. 1 furthermore includes a receiving unit 110. Receiving unit 110 receives light and, in particular, light reflected by object 107 in field of vision 106 as secondary light 109 via a receiving optics 111. Receiving optics 111 may, for example, include at least one lens or at least one optical filter. The received secondary light 109 is transmitted to a detector unit 112. The LIDAR sensor furthermore includes at least one linker, which is not shown in FIG. 1 for the sake of clarity. This linker is described in greater detail during the explanation of FIG. 5, in connection with FIG. 4.

The control of laser pattern generation unit 102 as well as of detector unit 112 takes place via control lines 114 and 115 with the aid of a control and evaluation unit 113. One exemplary embodiment of detector unit 112 is described in greater detail in FIG. 4.

Receiving unit 110 and transmitting unit 101 are designed with essentially biaxial optical axes on the field of vision side. LIDAR sensor 100 furthermore includes a rotor unit 116 rotatable about a rotation axis. In the exemplary embodiment, transmitting unit 101 is situated on rotor unit 116. Receiving unit 110 is also situated on rotor unit 116. The rotatable rotor unit 116 is activated with the aid of a control unit 117.

Figure 2:
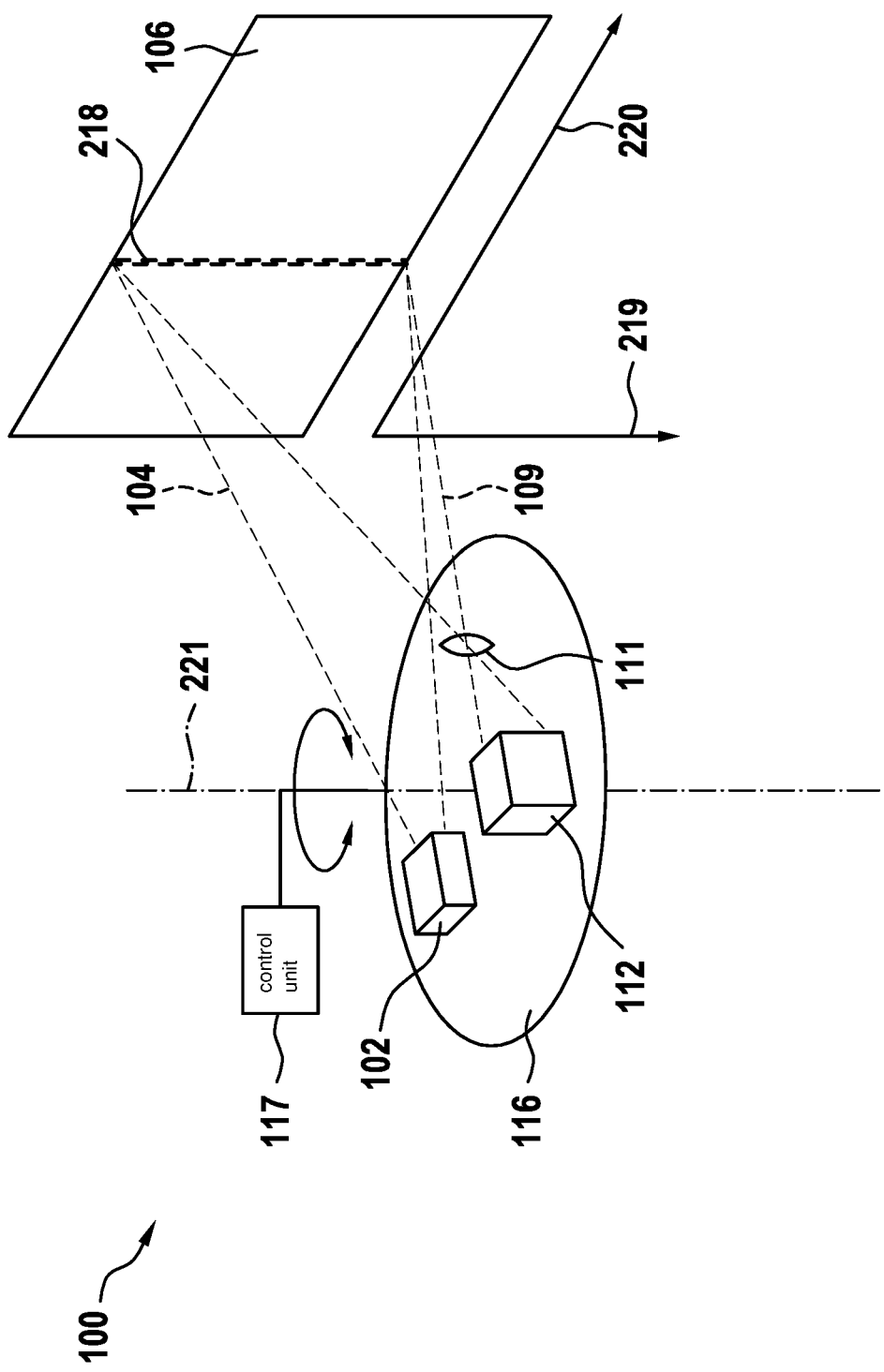
FIG. 2 shows a side view of the first exemplary embodiment of a LIDAR sensor, in accordance with the present invention.

FIG. 2 shows, by way of example, the side view of LIDAR sensor 100 described in FIG. 1. It is apparent in FIG. 2 that laser pattern generation unit 102 is designed to generate an illumination pattern 218 in field of vision 106. Illumination pattern 218 has a first direction 219 and a second direction 220. First direction 219 and second direction 220 are situated orthogonally to one another. An extension of illumination pattern 218 along first direction 219 is greater than an extension of illumination pattern 218 along second direction 220. Illumination pattern 218 of shown LIDAR sensor 100 is designed as a checked pattern in the process. Illumination pattern 218 may alternatively be designed as a line or as a rectangle.

It is shown in FIG. 2 that control unit 117 is designed to move the rotatable rotor unit 116 at least along second direction 220 about rotation axis 221. In this way, illumination pattern 218 is moved at least along second direction 220. The movement of illumination pattern 218 may, for example, take place incrementally or be carried out as a continuous scanning movement.

Transmitting unit 101 and receiving unit 110 of LIDAR sensor 100 are situated next to one another along rotation axis 221 of the rotatable rotor unit 116.

Figure 3:
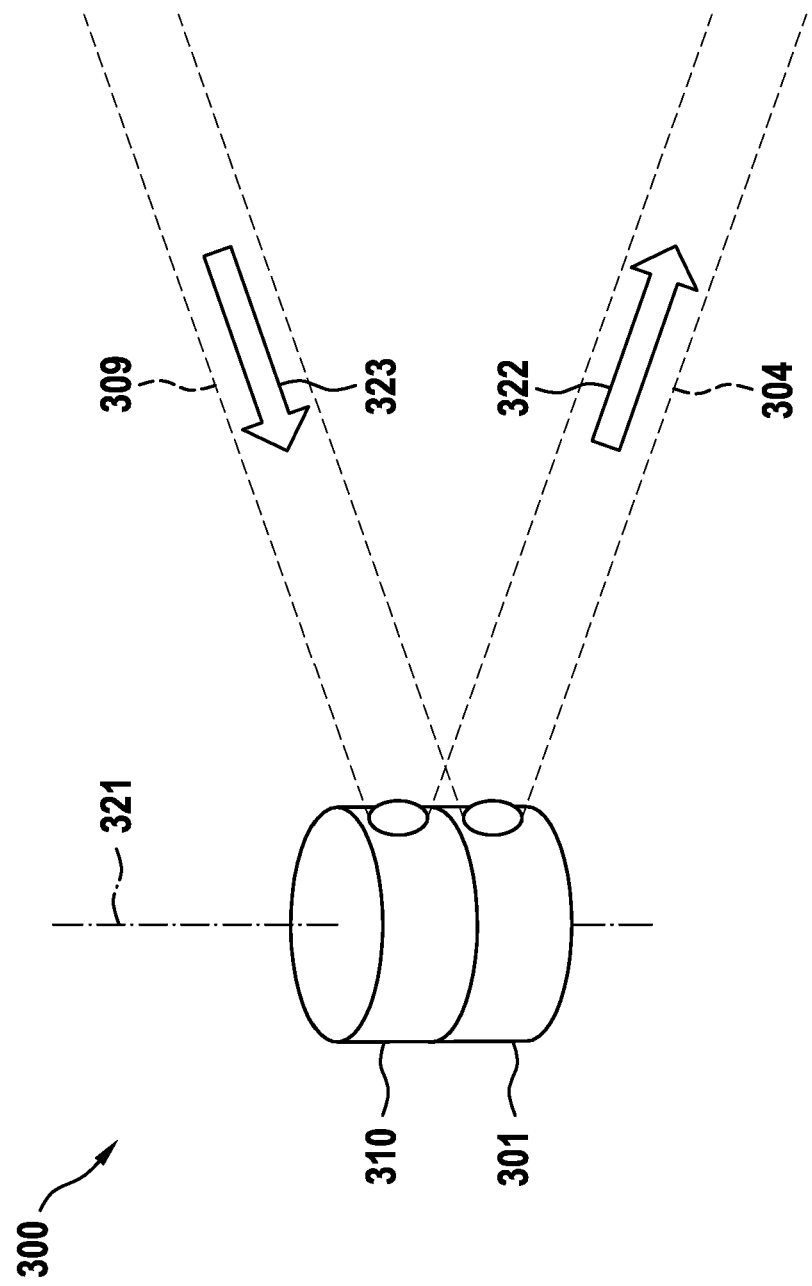
FIG. 3 shows a side view of a second exemplary embodiment of a LIDAR sensor, in accordance with the present invention.

FIG. 3 shows, by way of example, the side view of a LIDAR sensor 300. LIDAR sensor 300 includes transmitting unit 301 for emitting primary light 304 into a field of vision. The primary light is emitted along transmission direction 322. LIDAR sensor 300 furthermore includes receiving unit 310 for receiving secondary light 309 which was reflected and/or scattered by an object in the field of vision. The secondary light strikes receiving unit 310 at reception direction 323.

LIDAR sensor 300 essentially corresponds to LIDAR sensor 100 described in FIGS. 1 and 2. Transmitting unit 301 corresponds to transmitting unit 101 described in FIGS. 1 and 2. Receiving unit 310 corresponds to receiving unit 310 described in FIGS. 1 and 2. The difference compared to LIDAR sensor 100 is essentially only that, in the case of LIDAR sensor 300, transmitting unit 301 and receiving unit 310 are situated on top of one another along rotation axis 321 of the rotatable rotor unit.

In the described figures, first direction 219 and second direction 220 may be interchanged with one another, so that illumination pattern 218 extends along the second direction and is scanned along the first direction, i.e., the greater extension of the illumination pattern extends in the horizontal direction and is scanned in the vertical direction. The illumination pattern is, for example, configured as a laser line or in the form of a checked pattern.

Figure 4:
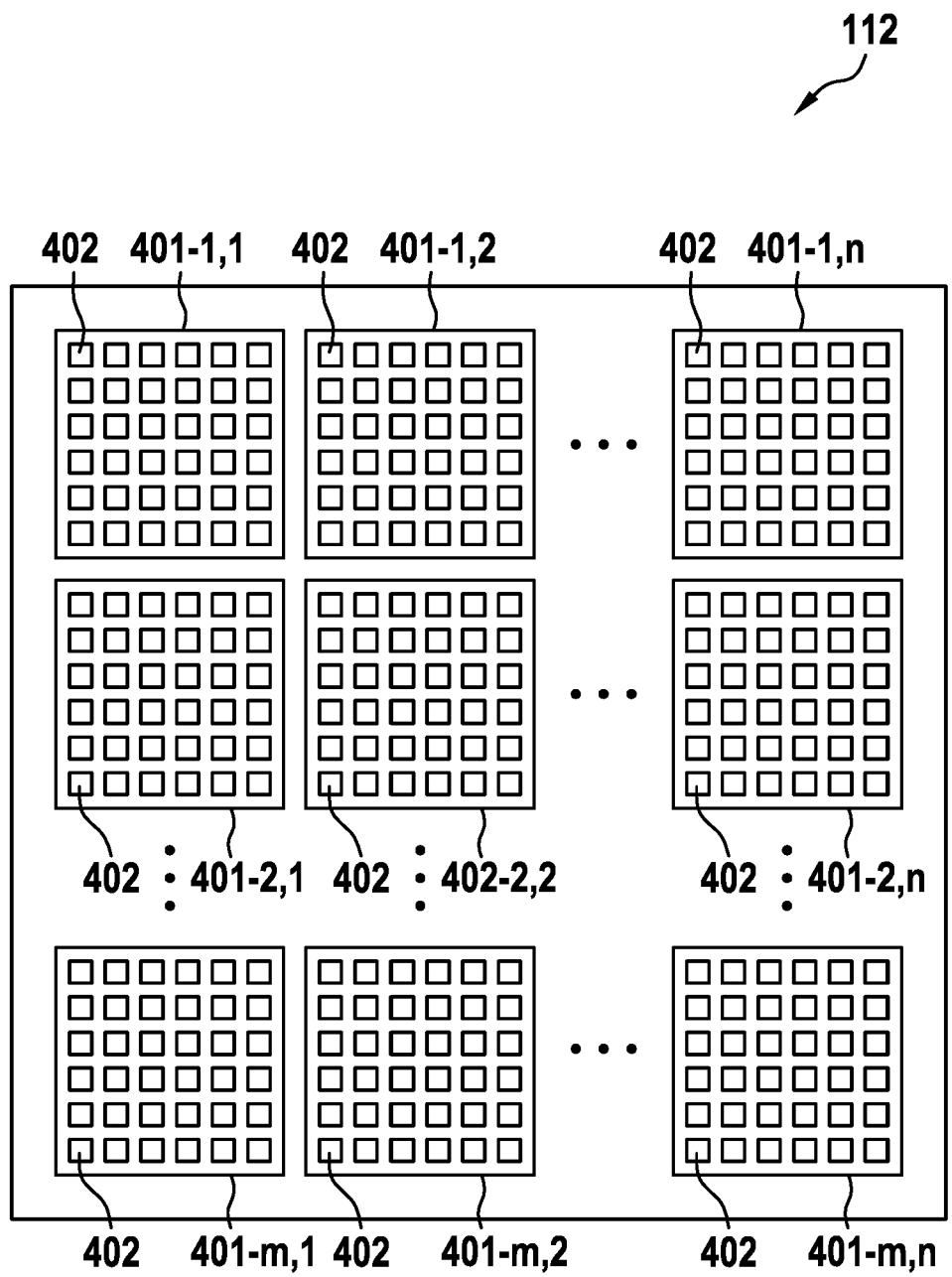
FIG. 4 shows a schematic representation of an exemplary embodiment of a detector unit of the LIDAR sensor, in accordance with the present invention.

FIG. 4 schematically and by way of example shows detector unit 112, as included by a LIDAR sensor 100, 300. Detector unit 112 includes a plurality of pixels 401-$m,n$. In the example, the pixels are situated in a grid having a predefined number m of rows and a predefined number n of columns. Number m is an integer in the process. Number m may be an integer 1 through i. Number n is an integer. Number n may be an integer 1 through j. In one specific embodiment, the value of number i and/or the value of number j may be limited by the requirements with respect to the eye safety for a given range of the LIDAR sensor.

In one specific embodiment, the value of number i and/or the value of number j may be limited by cost specifications or specifications with respect to the producibility. In the process, at least number m or at least number n is unequal to 1. At least one row or one column includes at least two pixels. As is shown in the example of FIG. 4, both number m of the rows and number n of the columns may be greater than 1. The detector unit is designed as a field of a plurality of pixels 401-$m,n$.

In the case of detector unit 112 shown in the example, pixels 401-$m,n$ each include a multitude of activatable single-photon avalanche diodes 402 (for the sake of clarity, only one single-photon avalanche diode 402 per pixel 401-m,n is denoted by a reference numeral). A single-photon avalanche diode 402 may be referred to as a subpixel in the process. Pixels 401-m,n of at least one row and/or pixels 401-m,n of at least one column are activatable in parallel.

Single-photon avalanche diodes 402 of a pixel 401-m,n are linked via a linker not shown in FIG. 4. Each of pixels 401-m,n of detector unit 112 shown in FIG. 4 may be assigned a respective linker, as it is shown by way of example in FIG. 5. So-called macropixels are created by linking at least two single-photon avalanche diodes 402 of a pixel 401-m,n. Pixels 401-m,n of detector unit 112 may be referred to as macropixels.

Figure 5:
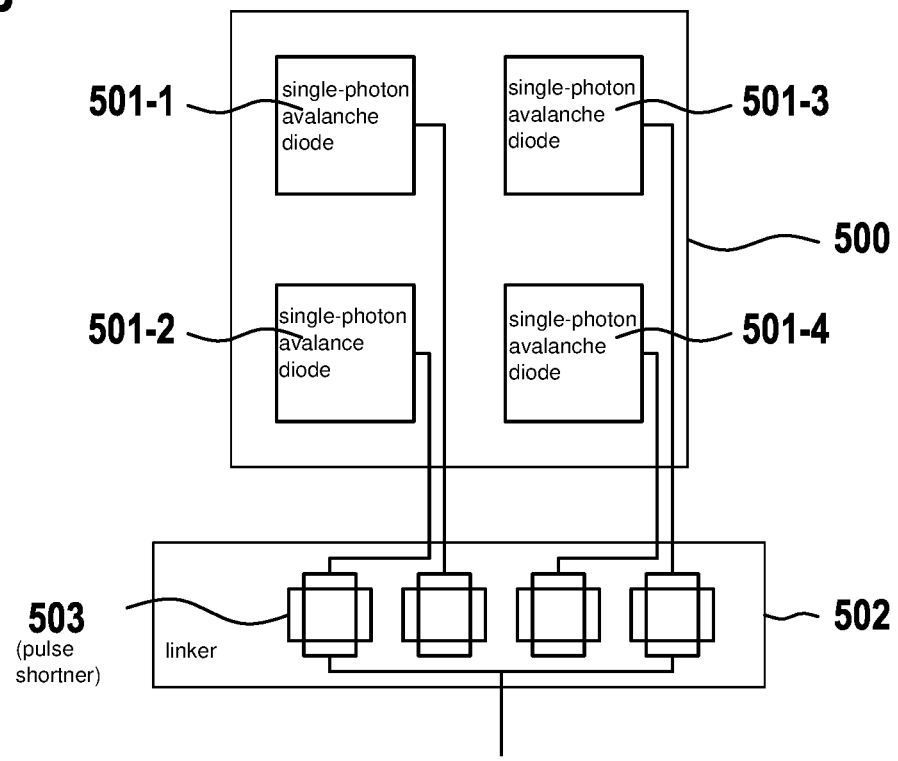
FIG. 5 shows a schematic representation of an exemplary embodiment of a pixel of the detector unit of the LIDAR sensor and a linker, in accordance with the present invention.

FIG. 5 schematically shows one exemplary embodiment of a pixel 500 of a detector unit 112, as included by a LIDAR sensor 100, 300 shown in FIGS. 1 through 3, and of a linker 502, as included by a LIDAR sensor 100, 300 shown in FIGS. 1 through 3. Pixel 500 may be part of a detector unit 112 described in the preceding figures.

The shown pixel 500 includes the four single-photon avalanche diodes 501-1 through 501-4, by way of example. Linker 502 links the four single-photon avalanche diodes 501-1 through 501-4 to one another. Linker 502 is designed to link detection signals of at least two of the four single-photon avalanche diodes 501-1 through 501-4 of pixel 500 via a combinational logic. Linker 502 may, in particular, be an OR linker or an exclusive OR linker. In the event that linker 502 is an OR linker, the LIDAR sensor may furthermore optionally include at least one pulse shortener 503. With the aid of the pulse shortener, a digital signal generated by a single-photon avalanche diode 501-1 through 501-4 may be temporally shortened.

Figure 6:
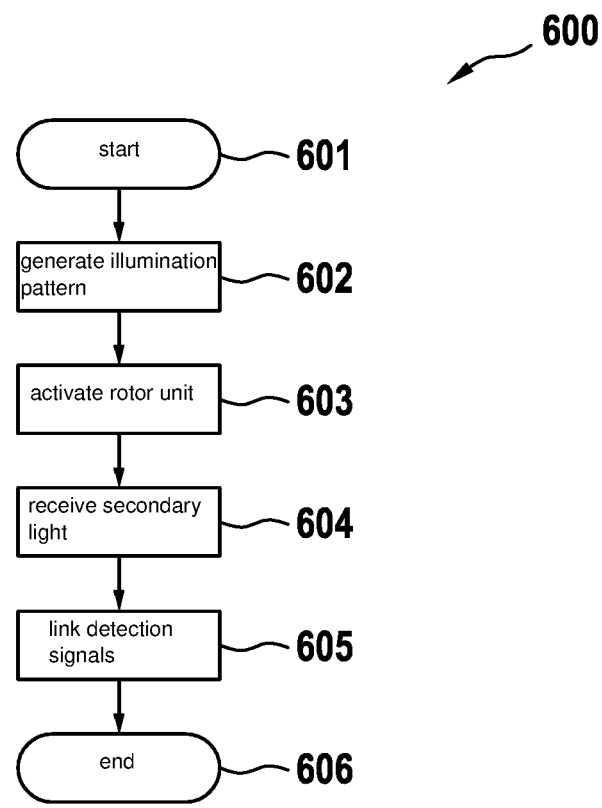
FIG. 6 shows an exemplary embodiment of a method for optically detecting a field of vision with the aid of a LIDAR sensor, in accordance with the present invention.

FIG. 6 shows, by way of example, a method for optically detecting a field of vision with the aid of a LIDAR sensor. The method begins with step 601. In step 602, an illumination pattern is generated in a field of vision. The illumination pattern has a first direction and a second direction in the process. The first direction and the second direction are situated orthogonally to one another, an extension of the illumination pattern along the first direction being greater than an extension of the illumination pattern along the second direction. In step 603, a rotor unit for the rotation about a rotation axis is activated with the aid of a control unit. The illumination pattern is thus moved at least along the second direction. In step 604, secondary light which was reflected and/or scattered by an object in the field of vision is received with the aid of at least one detector unit. The at least one detector unit includes a plurality of pixels in the process. At least some pixels in each case include a multitude of activatable single-photon avalanche diodes. In step 605, the detection signals of at least two single-photon avalanche diodes of a pixel are linked via a combinational logic with the aid of a linker. The method ends in step 606.

LIDAR sensors 100 and 300 and method 600 may be used both for detecting a field of vision of a vehicle and for detecting a field of vision of a working device.

What is claimed is:

1. A LIDAR sensor for optically detecting a field of vision, comprising:
   a transmitting unit including a laser pattern generation unit configured to emit primary light into the field of vision, the laser pattern generation unit being configured to generate an illumination pattern in the field of vision, the illumination pattern having a first direction and a second direction, the first direction and the second direction being situated orthogonally to one another, an extension of the illumination pattern along the first direction being greater than an extension of the illumination pattern along the second direction;
   a receiving unit including at least one detector unit configured to receive secondary light reflected and/or scattered by an object in the field of vision, the at least one detector unit including a plurality of pixels, and each pixel of at least some of the pixels including a multitude of activatable single-photon avalanche diodes;
   at least one rotor unit rotatable about a rotation axis, the transmitting unit being at least partially situated on rotor unit, and the receiving unit being at least partially situated on the rotor unit; and
   at least one linker configured to link detection signals of at least two single-photon avalanche diodes of a pixel of the at least one of the pixels via a combinational logic;
   wherein the illumination pattern is configured as a line or as a rectangle.

2. The LIDAR sensor as recited in claim 1, wherein the linker is an OR linker or an exclusive OR linker.

3. The LIDAR sensor as recited in claim 2, wherein the linker is the OR linker, and includes at least one pulse shortener to temporally shorten a digital signal generated by a single-photon avalanche diode.

4. The LIDAR sensor as recited in claim 1, wherein pixels are situated in a grid having a predefined number of rows and a predefined number of columns, the pixels of at least one row and/or the pixels of at least one column of the columns being activatable in parallel.

5. The LIDAR sensor as recited in claim 1, further comprising:
   at least one control unit configured to move the rotatable rotor unit at least along the second direction, so that the illumination pattern is moved at least along the second direction.

6. The LIDAR sensor as recited in claim 1, wherein the transmitting unit and the receiving unit are situated on top of one another or next to one another along the rotation axis of the rotatable rotor unit.

7. A working device or a vehicle, comprising:
   a LIDAR sensor for optically detecting a field of vision, including:
   a transmitting unit including a laser pattern generation unit configured to emit primary light into the field of vision, the laser pattern generation unit being configured to generate an illumination pattern in the field of vision, the illumination pattern having a first direction and a second direction, the first direction and the second direction being situated orthogonally to one another, an extension of the illumination pattern along the first direction being greater than an extension of the illumination pattern along the second direction;
   a receiving unit including at least one detector unit configured to receive secondary light reflected and/or scattered by an object in the field of vision, the at least one detector unit including a plurality of pixels, and each pixel of at least some of the pixels including a multitude of activatable single-photon avalanche diodes;
   at least one rotor unit rotatable about a rotation axis, the transmitting unit being at least partially situated on rotor unit, and the receiving unit being at least partially situated on the rotor unit; and
   at least one linker configured to link detection signals of at least two single-photon avalanche diodes of a pixel via a combinational logic;

wherein the illumination pattern is configured as a line or as a rectangle.

8. A method for optically detecting a field of vision using a LIDAR sensor, the method comprising:
- generating an illumination pattern in a field of vision, the illumination pattern having a first direction and a second direction, the first direction and the second direction being situated orthogonally to one another, an extension of the illumination pattern along the first direction being greater than an extension of the illumination pattern along the second direction;
- activating a rotor unit for the rotation about a rotation axis using a control unit, so that the illumination pattern is moved at least along the second direction;
- receiving secondary light, which was reflected and/or scattered by an object in the field of vision, using at least one detector unit, the at least one detector unit including a plurality of pixels, and each pixel of at least some of the pixels including a multitude of activatable single-photon avalanche diodes; and
- linking detection signals of at least two single-photon avalanche diodes of a pixel of the at least some of the pixels via a combinational logic using a linker;
- wherein the illumination pattern is configured as a line or as a rectangle.

* * * * *